(12) United States Patent
Petrichko et al.

(10) Patent No.: US 7,964,668 B2
(45) Date of Patent: *Jun. 21, 2011

(54) DUAL CURED CASTABLE POLYUREA SYSTEM FOR USE IN GOLF BALLS

(75) Inventors: Randy Petrichko, Fairhaven, MA (US); Shawn Ricci, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 363 days.

This patent is subject to a terminal disclaimer.

(21) Appl. No.: 12/122,370

(22) Filed: May 16, 2008

(65) Prior Publication Data

US 2009/0286626 A1    Nov. 19, 2009

(51) Int. Cl.
*A63B 37/12* (2006.01)
*C08G 18/62* (2006.01)
*C08G 18/82* (2006.01)

(52) U.S. Cl. ............. 525/131; 528/59; 528/60; 528/61; 528/64; 528/65; 528/75; 473/378

(58) Field of Classification Search ........................ None
See application file for complete search history.

(56) References Cited

U.S. PATENT DOCUMENTS

| | | | |
|---|---|---|---|
| 3,652,520 A | 3/1972 | Ryan et al. ................ 260/86.1 |
| 4,560,168 A | 12/1985 | Aoyama ........................ 273/232 |
| 4,658,062 A | 4/1987 | Hinney et al. ................... 564/305 |
| 4,960,281 A | 10/1990 | Aoyama ........................ 273/232 |
| 4,994,621 A | 2/1991 | Yeakey et al. .................. 564/475 |
| 5,334,673 A | 8/1994 | Wu ............................ 273/235 R |
| 5,484,870 A | 1/1996 | Wu ................................. 528/28 |
| 5,688,191 A | 11/1997 | Cavallaro et al. ............. 473/373 |
| 5,692,974 A | 12/1997 | Wu et al. ........................ 473/377 |
| 5,713,801 A | 2/1998 | Aoyama ........................ 473/354 |
| 5,803,831 A | 9/1998 | Sullivan et al. ............... 473/374 |
| 5,849,168 A | 12/1998 | Lutz ............................ 264/755 |
| 5,885,172 A | 3/1999 | Hebert et al. .................. 473/354 |
| 5,908,358 A | 6/1999 | Wu ................................. 473/378 |
| 5,919,100 A | 7/1999 | Boehm et al. ................. 473/354 |
| 5,965,669 A | 10/1999 | Cavallaro et al. ............. 525/221 |
| 5,981,654 A | 11/1999 | Rajagopalan .................... 525/66 |
| 5,981,658 A | 11/1999 | Rajagopalan et al. ........... 525/72 |
| 6,056,842 A | 5/2000 | Dalton et al. .................. 156/243 |
| 6,149,535 A | 11/2000 | Bissonnette et al. .......... 473/354 |
| 6,180,040 B1 | 1/2001 | Ladd et al. ..................... 264/248 |
| 6,180,722 B1 | 1/2001 | Dalton et al. .................. 525/193 |
| 6,207,784 B1 | 3/2001 | Rajagopalan .................... 528/71 |
| 6,386,992 B1 | 5/2002 | Harris et al. ................... 473/371 |
| 6,503,156 B1 | 1/2003 | Sullivan ........................ 473/374 |
| 6,506,130 B2 | 1/2003 | Sullivan ........................ 473/374 |
| 6,831,136 B2 | 12/2004 | Chao et al. .................... 525/377 |
| 6,835,794 B2 | 12/2004 | Wu et al. ......................... 528/64 |
| 7,157,527 B2 | 1/2007 | Kuntimaddi et al. ......... 525/454 |
| 7,211,624 B2 | 5/2007 | Wu et al. ..................... 525/92 C |
| 7,481,956 B2 | 1/2009 | Wu et al. ....................... 264/255 |
| 2001/0009310 A1 | 7/2001 | Hebert et al. | |
| 2001/0018375 A1 | 8/2001 | Hayashi et al. | |
| 2001/0019971 A1 | 9/2001 | Hayashi et al. | |
| 2002/0025862 A1 | 2/2002 | Sullivan et al. | |
| 2002/0028885 A1 | 3/2002 | Sullivan et al. | |
| 2003/0199337 A1 | 10/2003 | Hebert et al. | |
| 2003/0212240 A1 | 11/2003 | Wu et al. | |
| 2004/0097653 A1 * | 5/2004 | Kim et al. ....................... 525/130 |
| 2006/0009309 A1 * | 1/2006 | Rajagopalan et al. ........ 473/371 |
| 2006/0017201 A1 | 1/2006 | Wu et al. | |
| 2006/0116481 A1 | 6/2006 | Morgan | |
| 2009/0283932 A1 * | 11/2009 | Petrichko et al. ............. 264/250 |
| 2009/0286626 A1 * | 11/2009 | Petrichko et al. ............. 473/378 |
| 2009/0286627 A1 * | 11/2009 | Petrichko et al. ............. 473/378 |
| 2009/0286629 A1 * | 11/2009 | Petrichko et al. ............. 473/378 |

OTHER PUBLICATIONS

Huanh, Gas Permeability of Crosslinked HTPB-H12MDI-Based Polyurethane Membrane; Journal of Applied Polymer Science vol. 58; 1995 pp. 1913-1923.*
U.S. Appl. No. 12/187,046.
U.S. Appl. No. 12/184,502.
U.S. Appl. No. 12/122,370.
U.S. Appl. No. 11/429,055.
U.S. Appl. No. 11/373,264.
Non-Final Office Action dated Nov. 10, 2009 of corresponding U.S. Appl. No. 12/122,396.

* cited by examiner

*Primary Examiner* — David Buttner
(74) *Attorney, Agent, or Firm* — Murphy & King, P.C.

(57) ABSTRACT

Compositions for golf balls that include polyurea linkages and that are crosslinked in the soft segments of the polymer backbone. In particular, the compositions of the invention, which are based on a polyurea have improved crosslink density from the crosslinking between the soft, unsaturated segments of the polymer backbone. The curative blend includes at least one isocyanate-reactive component and a free radical initiator.

17 Claims, 3 Drawing Sheets

DUAL CURED CASTABLE POLYUREA SYSTEM FOR USE IN GOLF BALLS

FIELD OF THE INVENTION

The present invention relates to compositions for golf balls that include modified polyurea. In particular, the compositions of the invention, which include a polymer backbone including urea linkages are crosslinked both in the soft and hard segments. The compositions of the invention may be used in any layer of a golf ball, e.g., an outer cover layer or inner cover layer, or may be used as a coating to be disposed over a structural outer layer of a golf ball.

BACKGROUND OF THE INVENTION

Golf ball manufacturers have been experimenting with various materials and manufacturing methods for golf balls over the years in an attempt to improve overall performance and durability and to further refine the manufacturing process.

For example, over the past years, golf ball manufacturers have been using ionomer resins for golf ball cover materials because of the durability, rebound, and scuff resistance characteristics of the materials. However, while ionomer resins are more durable than other types of golf ball layer materials, the same properties that result in durability also provide a hard "feel" and generally result in a lower spin rate and, thus, lower control, due to the hardness of the material.

Alternatively, polyurethane compositions produce "soft" covers and typically allow for greater control because of the increased spin. Because conventional polyurethane cover materials are typically formed of aromatic components, the ultraviolet degradation of the material, which leads to yellowing, led to the recent trend toward light stable cover materials, such as aliphatic polyurethane and polyurea materials. Whether aromatic or aliphatic in nature, however, the relative softness of the polyurethane and polyurea materials introduces durability issues.

Further attempts to compensate for the "hard" feel of ionomer-covered golf balls and durability and adhesion issues with polyurethane-covered and polyurea-covered golf balls have resulted in blends of hard ionomer resins, i.e., resins with hardness values of about 60 Shore D and above, with relatively softer polymeric materials. For example, blends of hard ionomers with polyurethanes have been used to form intermediate layers and cover layers of golf balls. However, such blends generally have processing difficulties associated with their use in the production of golf balls due to the incompatibility of the components. In addition, golf balls produced from these incompatible mixtures will have inferior golf ball properties such as poor durability, cut resistance, and the like.

As such, a need exists in the golf ball art for materials that have the performance benefits of polyurethane and polyurea, but higher hardness and higher flexural modulus values, as well as improved hydrophobicity. In addition, golf balls having layers formed, at least in part, from such compositions would be advantageous. The present invention addresses such materials, methods of forming the materials, and portions of golf balls formed from these materials.

SUMMARY OF THE INVENTION

The present invention is directed to a golf ball including a core and a cover, wherein the cover is formed from a composition including: a prepolymer including the reaction product of an isocyanate-containing component and a first isocyanate-reactive component, wherein the first isocyanate-reactive component includes a conjugated diene hydrocarbon including at least two amino groups; and a curative blend including a second isocyanate-reactive component including at least two amino groups and at least one free radical initiator, which may be peroxide, wherein the composition includes crosslinks between the hydrocarbons.

In one embodiment, the isocyanate-containing component includes at least two isocyanate groups. In another embodiment, the first isocyanate-reactive component includes amine-terminated polybutadiene. For example, the amine-terminated polybutadiene may include primary amino groups at the terminal ends of the polybutadiene. In the alternative, the amine-terminated polybutadiene may include secondary amino groups at the terminal ends of the polybutadiene. In another embodiment, the amine-terminated polybutadiene includes primary amino groups, secondary amino groups, or a combination thereof at the terminal ends of the polybutadiene.

The present invention is also directed to a golf ball including: a core; and a cover formed from a composition including: a prepolymer including: a polymer backbone including a conjugated diene and urea linkages; and a plurality of terminal ends including isocyanate groups; a curative blend including an isocyanate-reactive component and a free radical initiator, wherein the isocyanate-reactive component includes at least two terminal amino groups capable of reacting with the isocyanate groups, and wherein the free radical initiator is capable of crosslinking the polymer backbone. In one embodiment, the polymer backbone includes polybutadiene. In another embodiment, the free radical initiator includes peroxide. In this aspect of the invention, the isocyanate-reactive component may include a amine-terminated component. As such, the composition consists essentially of urea linkages.

The present invention also relates to a method of forming a golf ball including a core and a cover including the steps of (1) providing a core; (2) providing a conjugated diene including a plurality of terminal ends including amino groups; (3) reacting the conjugated diene with an isocyanate-containing component to form a prepolymer including urea linkages; (4) forming a curative blend including: a amine-terminated curing agent; and an organic peroxide; (5) reacting the prepolymer and curative blend to form a composition including urea linkages and crosslinks between the hydrocarbons; and (6) casting a golf ball cover about the core from the composition.

The plurality of terminal ends may include primary amino groups, secondary amino groups, or a combination thereof. In one embodiment, the isocyanate-containing component includes at least two isocyanate groups. In another embodiment, the conjugated diene includes amine-terminated polybutadiene.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
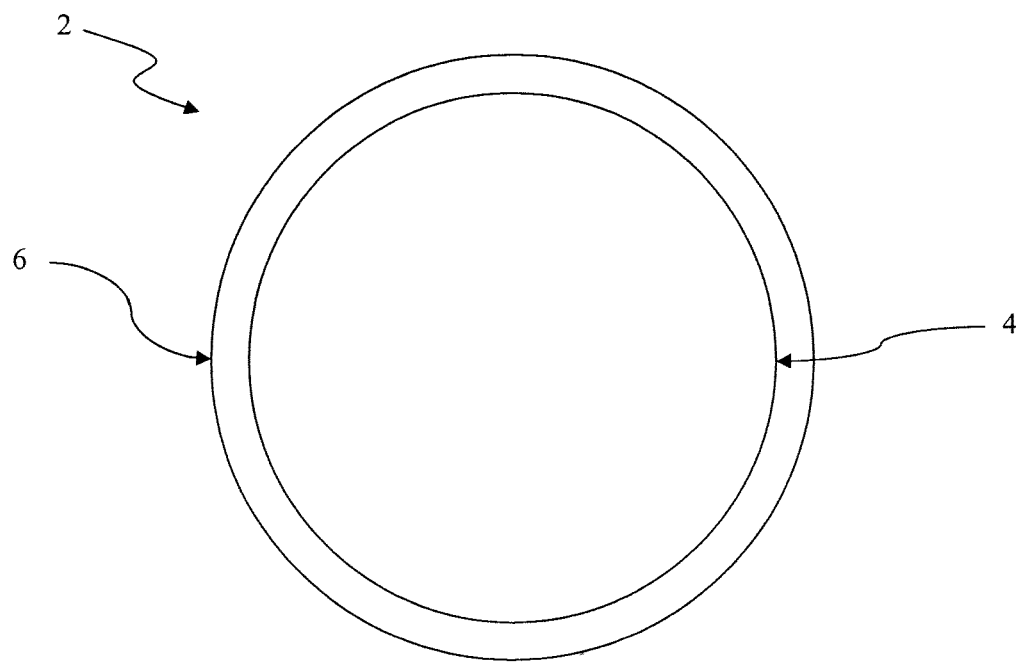
FIG. 1 is a cross-sectional view of a two-piece golf ball, wherein the cover is formed from a composition of the invention.

Because crosslinking in conventional castable reactive liquid materials is limited to the hard segments, i.e., the isocyanate groups, the ability to increase crosslinking density and, thus, hardness is limited. Thus, the present invention relates to compositions for use in golf balls that include polyurethane systems, polyurea systems, and mixtures thereof that are crosslinked both in the hard and soft segments of the polymer. In particular, the compositions of the invention include the reaction product of an isocyanate-containing component and an isocyanate-reactive component that is subjected to a curing process that involves a first curative that crosslinks the hard segments in the polymer and a second curative that crosslinks the soft segments.

The compositions of the invention provide an alternative to thermoplastic materials, such as ionomers, that are typically used as outer covers on large core balls or inner covers on multilayer balls with relatively soft covers. In fact, without being bound to any particular theory, golf balls that include the compositions of the invention as cover layers or intermediate layers have improved moisture resistance and durability. In addition, the present invention explores the methods of making such compositions and the golf balls that are formed using the compositions in portions thereof.

The compositions of the invention can be used with a variety of golf ball constructions. For example, the compositions of the invention may be used as a cover layer in a two-piece ball with a large core, an outer cover layer in a three-piece ball with a relatively thin inner cover layer, an intermediate layer in a three-piece ball, or an inner cover layer in a golf ball having dual cover layers. In addition, the compositions of the invention may be used to form coatings for golf balls. The composition components, golf ball constructions, and layer and ball properties are discussed in greater detail below.

The Compositions of the Invention

The compositions of the invention include a prepolymer that is the reaction product of an isocyanate-containing component and an isocyanate-reactive component, which is crosslinked with a combination of a curing agent and a free radical initiator. In particular, the reaction product of the isocyanate-containing component and isocyanate-reactive component produces a prepolymer including polyurethane linkages, polyurea linkages, or a combination thereof. The components of the composition are discussed below.

Prepolymer

The prepolymer used in the compositions of the invention may be based on a polyurethane, a polyurea, or a combination thereof. For example, the prepolymer may include urethane linkages, which is referred to herein as a polyurethane prepolymer, urea linkages, which is referred to herein as a polyurea prepolymer, or urethane and urea linkages, which is referred to herein as a hybrid prepolymer, each of which are discussed in more detail below.

Polyurethane Prepolymer

When based on polyurethane, the prepolymer is a product formed by a reaction between at least one isocyanate and at least one hydroxy-terminated component. The components of the polyurethane prepolymer may be aromatic, aromatic-aliphatic, or aliphatic, which provide varying degrees of light stability. As used herein, aromatic aliphatic compounds should be understood as those containing an aromatic ring, wherein the isocyanate group is not directly bonded to the ring.

Along a continuum, an aromatic composition is less light stable than an aromatic-aliphatic composition, which is less light stable than an aliphatic composition. For example, an aliphatic composition made according to the invention includes only saturated components, i.e., components substantially free of unsaturated carbon-carbon bonds or aromatic groups, the use of which prevents yellowing over time. The term "saturated," as used herein, refers to compositions having saturated aliphatic and alicyclic polymer backbones, i.e., with no carbon-carbon double bonds. It is important to note, however, that aromatic compositions made according to the invention may include light stabilizers to improve light stability. Thus, light stability may be accomplished in a variety of ways for the purposes of this application.

Isocyanates for use with the polyurethane prepolymer include aliphatic, cycloaliphatic, aromatic aliphatic, aromatic, derivatives thereof, and combinations of these compounds having two or more isocyanate (NCO) groups per molecule. As briefly mentioned above, however, the isocyanate may be saturated to improve the light stability of the composition of the invention. The isocyanates may be organic polyisocyanate-terminated precursors, low free isocyanate precursors, and mixtures thereof. The isocyanate component may also include any isocyanate-functional monomer, dimer, trimer, or multimeric adduct thereof, precursor, quasi-precursor, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic or linear or branched hydrocarbon moiety containing from about 1 to 20 carbon atoms. The diisocyanate may also contain one or more cyclic groups. When multiple cyclic groups are present, linear and/or branched hydrocarbons containing from about 1 to 10 carbon atoms can be present as spacers between the cyclic groups. In some cases, the cyclic group(s) may be substituted at the 2-, 3-, and/or 4-positions, respectively. Substituted groups may include, but are not limited to, halogens, primary, secondary, or tertiary hydrocarbon groups, or a mixture thereof.

Examples of saturated (aliphatic) diisocyanates that can be used in the polyurethane precursor include, but are not limited to, ethylene diisocyanate; propylene-1,2-diisocyanate; tetramethylene diisocyanate; tetramethylene-1,4-diisocyanate; 1,6-hexamethylene diisocyanate (HDI); HDI biuret prepared from HDI; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In one embodiment, the saturated diisocyanates include isophoronediisocyanate (IPDI), 4,4'-dicyclohexylmethane diisocyanate ($H_{12}$MDI), 1,6-hexamethylene diisocyanate (HDI), or a combination thereof.

As briefly discussed, aromatic aliphatic isocyanates may also be used to form the polyurethane precursor. While use of aromatic aliphatic materials does not confer the same amount of light stability to the resultant product compared to those including purely aliphatic materials, it does provide a greater degree of light stability to the resultant product compared to those formed with purely aromatic materials. Examples of aromatic aliphatic isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof, a modified polyisocyanate derived from the above isocyanates and polyisocyanates; and mixtures thereof. In addition, the aromatic aliphatic isocyanates may be mixed with any of the saturated isocyanates listed above for the purposes of this invention.

Unsaturated diisocyanates, i.e., aromatic compounds, may also be used with the present invention, although the use of unsaturated compounds in the precursor is preferably coupled with the use of a light stabilizer or pigment as discussed below. Examples of unsaturated diisocyanates include, but are not limited to, substituted and isomeric mixtures including 2,2'-, 2,4'-, and 4,4'-diphenylmethane diisocyanate (MDI), 3,3'-dimethyl-4,4'-biphenyl diisocyanate (TODI), toluene diisocyanate (TDI), polymeric MDI (PMDI, a brown liquid composed of approximately 50% methylene diisocyanate with the remainder comprised of oligomers of MDI), carbodimide-modified liquid 4,4'-diphenylmethane diisocyanate, para-phenylene diisocyanate (PPDI), meta-phenylene diisocyanate (MPDI), triphenylmethane-4,4'-, and triphenylmethane-4,4"-triisocyanate, naphthylene-1,5,-diisocyanate, 2,4'-, 4,4'-, and 2,2'-biphenyl diisocyanate, polyphenylene polymethylene polyisocyanate (PMDI) (also known as polymeric PMDI), and mixtures thereof.

An isocyanate group reacts with the hydroxy groups of the hydroxy-terminated component to form a repeating urethane linkage, which has the following general structure:

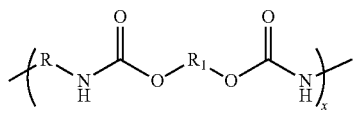

where x is the chain length, i.e., about 1 or greater, and R includes straight chain or branched hydrocarbon chains having about 1 to about 20 carbons, phenyl groups, and mixtures thereof, and $R_1$ is a straight chain or branched hydrocarbon chain having about 1 to about 20 carbons.

The hydroxy-terminated component suitable for the present invention may be organic, modified organic, saturated, aliphatic, alicyclic, unsaturated, araliphatic, aromatic, substituted, or unsubstituted in nature. The hydroxy-terminated component may be hydroxy-terminated polyhydrocarbons including, but not limited to, hydroxy-terminated polybutadiene, hydroxy-terminated polyisoprene; poly(hydrogenated isoprene)polyol; poly(hydrogenated butadiene)polyol; and mixtures thereof.

In particular, the hydroxy-terminated component preferably has two or more reactive hydrogen groups per molecule, such as primary or secondary hydroxy groups, and at least one conjugated diene hydrocarbon. The conjugated diene hydrocarbon may be unsubstituted, 2-substituted, or 2,3-disubstituted 1,3-dienes or 4 up to about 12 carbon atoms. In one embodiment, the diene has up to 6 carbon atoms and the substituents in the 2- and/or 3-position may be H, alkyl, preferably lower alkyl, aryl, halogen, and mixtures thereof. The diene may be 1,3-butadiene, isoprene, 2-cyano-1,3-butadiene, 2,3-dimethyl-1,3,butadiene, 2-phenyl-1,3-butadiene, 2-methyl-3-phenyl-1,3-butadiene, and the like.

In one embodiment, the hydroxy-terminated component includes hydroxy-terminated polybutadiene (HTPB) where the functional hydroxy groups are primary hydroxy groups, secondary hydroxy groups, or a combination thereof. The HTPB may have a hydroxyl functionality of about 1.8 to about 3 per chain. In one embodiment, the hydroxyl functionality is about 2 to about 3 per chain. In another embodiment, the hydroxyl functionality of the HTPB is about 2.2 to about 2.6 per chain. Because the hydroxyl functionality has an effect on the viscosity during prepolymer preparation, in one embodiment, the hydroxyl functionality of the HTPB is about 2.0 to about 2.3 per chain. In fact, the use of a HTPB with lower hydroxyl functionality may alleviate the need for more isocyanate, which increases cost and handling issues, to reduce the viscosity Those of ordinary skill in the art would be aware of suitable methods to synthesize HTPB for use in the present invention. For example, diene monomers and hydrogen peroxide in a solvent are subjected to free radical addition polymerization using hydrogen peroxide as the catalyst. As recognized by a skilled artisan, the ratio of cis-1,4 and trans-1,4 and 1,2-vinyl unsaturation that occurs in the diene polymers, the number and location of hydroxy groups, and the molecular weight of the HTPB may be a function of the polymerization temperature and the type of addition polymerization system employed in forming the polymer.

Further examples of HTPB and methods of preparing HTPB are provided in U.S. Pat. No. 3,652,520, the disclosure of which is incorporated by reference herein. HTPB is also commercially available from Sartomer as Poly bd® resins, including Poly bd® R-45HTLO and R-20LM, and Krasol® LBH resins.

When a diisocyanate is reacted with a hydroxy-terminated component of the present invention, long polymer chains are formed. A general reaction scheme between a diisocyanate and a hydroxy-terminated component having primary hydroxy groups according to the invention is as follows:

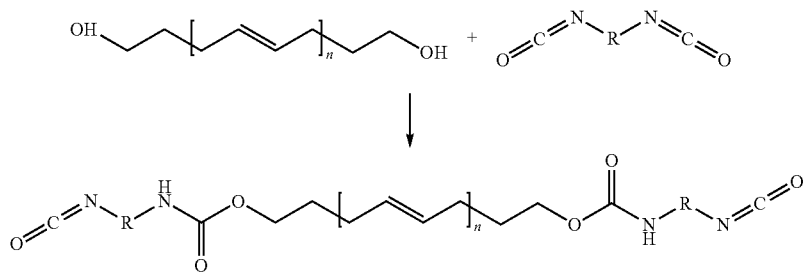

where n is the chain length, i.e., about 1 or greater, and R is a straight chain or branched hydrocarbon chain having about 1 to about 20 carbons, a phenyl group, or a mixture thereof.

In addition, when the hydroxy-terminated component includes secondary hydroxy groups, the reaction scheme is as follows:

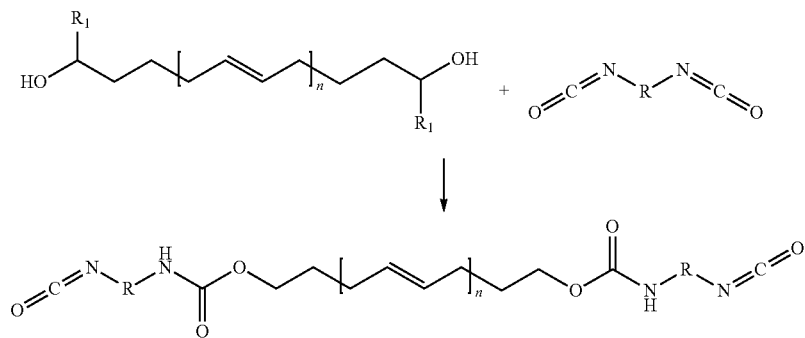

where n is the chain length, i.e., about 1 or greater, and R and $R_1$ are independently straight chains or branched hydrocarbon chains having about 1 to about 20 carbons, a phenyl group, or a mixture thereof.

Furthermore, when the hydroxy-terminated component includes a mixture of primary and secondary hydroxy-terminated components, the reaction scheme is as follows:

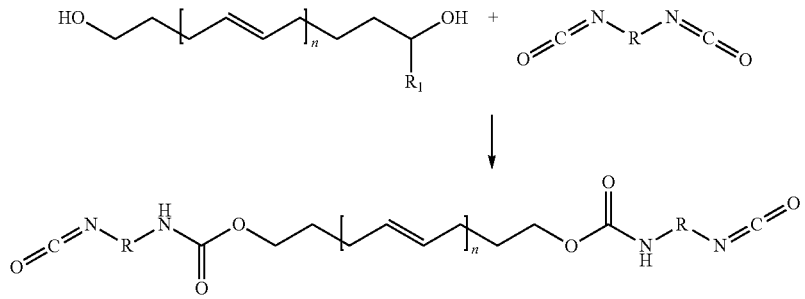

where n is the chain length, i.e., about 1 or greater, and R and $R_1$ are independently straight chains or branched hydrocarbon chains having about 1 to about 20 carbons, a phenyl group, or a mixture thereof.

The hydroxy-terminated component may also be blended with other hydroxyl-terminated components including, but not limited to, hydroxy-terminated polyester, hydroxy-terminated polyether, hydroxy-terminated polycarbonate, hydroxy-terminated polycaprolactones, hydroxy-terminated polyhydrocarbons, hydroxy-terminated acid functional oligomers or polymers (or ionomers thereof derived from partial or full neutralization with organic or inorganic cations)

As known to those of ordinary skill in the art, the polyurethane prepolymer contains some amount of free isocyanate monomer. Thus, in one embodiment, the polyurethane prepolymer is stripped of free isocyanate monomer. For example, after stripping, the precursor may contain about 1 percent or less free isocyanate monomer. In another embodiment, the precursor contains about 0.5 percent by weight or less of free isocyanate monomer.

Polyurea Prepolymer

The prepolymer may also be based on a urea linkages, where the prepolymer is a product formed by a reaction between at least one isocyanate-containing component and at least one amine-terminated component. For the purposes of the present invention, the polyurea prepolymers include primarily urea linkages having the following general structure:

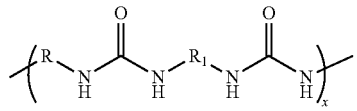

where x is the chain length, i.e., about 1 or greater, and R includes straight chain or branched hydrocarbon chains having about 1 to about 20 carbons, phenyl groups, and mixtures thereof, and $R_1$ is a straight chain or branched hydrocarbon chain having about 1 to about 20 carbons.

Because the main difference between the polyurethane prepolymer discussed above and the polyurea prepolymer discussed in this section is the substitution of the hydroxy-terminated component with an amine-terminated component. Therefore, the isocyanates suitable for inclusion in the polyurea prepolymers are the same as those listed above with respect to the polyurethane prepolymers, which are incorporated by reference here. And, as above, while saturated isocyanates are preferred, aromatic aliphatic isocyanates and aromatic isocyanates are contemplated for use with the present invention.

It should be understood, however, that a prepolymer including primarily urea linkages may have distinctly different properties than a prepolymer including primarily urethane linkages due to the substitution of the hydroxy-terminated component with the amine-terminated component. For example, when a polyurea prepolymer is used, the resulting composition may have different shear, cut, resiliency, and adhesion properties than a composition with formed from a polyurethane prepolymer.

The amine-terminated component suitable for the present invention may be organic, modified organic, saturated, aliphatic, alicyclic, unsaturated, araliphatic, aromatic, substituted, or unsubstituted in nature. The molecular weight of the amine-terminated component for use in the invention may range from about 100 to about 10,000. In one embodiment, the amine-terminated component is about 500 or greater, preferably about 1000 or greater, and even more preferably about 2000 or greater. In another embodiment, the amine-terminated component molecular weight is about 8000 or less, preferably about 4,000 or less, and more preferably about 3,000 or less. For example, in one embodiment, the molecular weight of the amine-terminated component is about 1000 to about 4000. Because lower molecular weight amine-terminated components may be prone to forming solid polyureas, a higher molecular weight oligomer may be used to avoid solid formation.

The amine-terminated component may be amine-terminated polyhydrocarbons including, but not limited to, amine-terminated polybutadiene, amine-terminated polyisoprene; poly(hydrogenated isoprene)amine; poly(hydrogenated butadiene)amine; and mixtures thereof. In particular, the hydroxy-terminated component preferably has two or more reactive amino groups per molecule, such as primary or secondary amino groups, and at least one conjugated diene hydrocarbon. The conjugated diene hydrocarbon may be unsubstituted, 2-substituted, or 2,3-disubstituted 1,3-dienes or 4 up to about 12 carbon atoms. In one embodiment, the diene has up to 6 carbon atoms and the substituents in the 2- and/or 3-position may be H, alkyl, preferably lower alkyl, aryl, halogen, and mixtures thereof. The diene may be 1,3-butadiene, isoprene, 2-cyano-1,3-butadiene, 2,3-dimethyl-1, 3,butadiene, 2-phenyl-1,3-butadiene, 2-methyl-3-phenyl-1, 3-butadiene, and the like.

In one embodiment, the amine-terminated component includes amine-terminated polybutadiene (ATPB) where the functional amino groups are primary amino groups, secondary amino groups, or a combination thereof. The ATPB may have amino functionality of about 1.8 to about 3 per chain. In one embodiment, the amino functionality is about 2 to about 3 per chain. In another embodiment, the amino functionality of the ATPB is about 2.2 to about 2.6 per chain. Because the amino functionality has an effect on the viscosity during prepolymer preparation, in one embodiment, the amino functionality of the ATPB is about 2.0 to about 2.3 per chain. In fact, the use of a ATPB with lower amino functionality may alleviate the need for more isocyanate, which increases cost and handling issues, to reduce the viscosity.

Those of ordinary skill in the art would be aware of methods to prepare amine-terminated polybutadienes for use with the present invention. For example, ATPBs may be synthesized from functionalized initiators and butadiene monomer or by converting hydroxyl-terminated polybutadiene (HTPB) to ATPB by multi-step synthetic pathways. U.S. Pat. No. 4,658,062, the entire disclosure of which is incorporated by reference herein, discusses such methods. In addition, U.S. Pat. No. 4,994,621 discloses reacting liquid HTPB polymer with several oxirane units per hydroxyl group, to produce a secondary hydroxyl-terminated polymer containing ether linkages, which are then aminated by reacting ammonia with the hydroxy groups under reducing conditions provided by hydrogen under pressure. Furthermore, ATPBs having one or two terminal amino groups may be prepared by cyanoalkylating a hydroxy-terminated polybutadiene by Michael addition of acrylonitrile in the presence of a base, forming nitrile termination, followed by hydrogenation in the presence of a Group VIII metal as catalyst. U.S. Pat. No. 6,831,136, the disclosure of which is incorporated by reference herein in its entirety, discusses such a method.

When a diisocyanate is reacted with an amine-terminated component of the present invention, long polymer chains are formed. A general reaction scheme between a diisocyanate and a amine-terminated component having primary amino groups according to the invention is as follows:

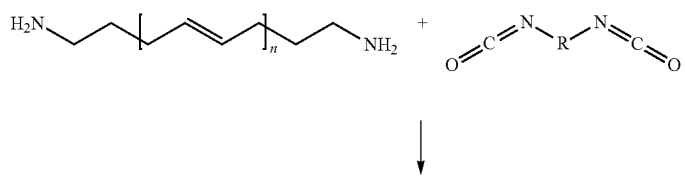

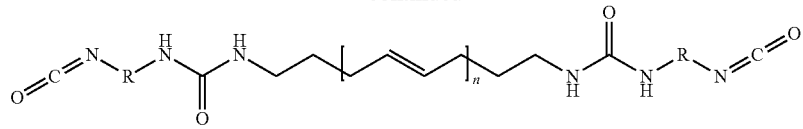

where n is the chain length, i.e., about 1 or greater, and R and $R_1$ are independently straight chains or branched hydrocarbon chains having about 1 to about 20 carbons, a phenyl group, or a mixture thereof.

In addition, when the amine-terminated component includes secondary amino groups, the reaction scheme is as follows:

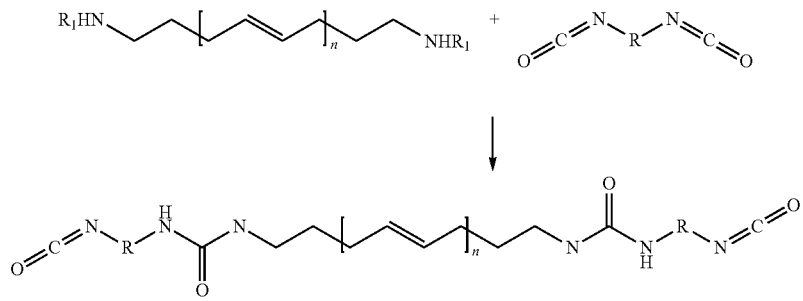

where n is the chain length, i.e., about 1 or greater, and R and $R_1$ are independently straight chains or branched hydrocarbon chains having about 1 to about 20 carbons, a phenyl group, or a mixture thereof.

Furthermore, when the amine-terminated component includes a mixture of primary and secondary amine-terminated components, the reaction scheme is as follows:

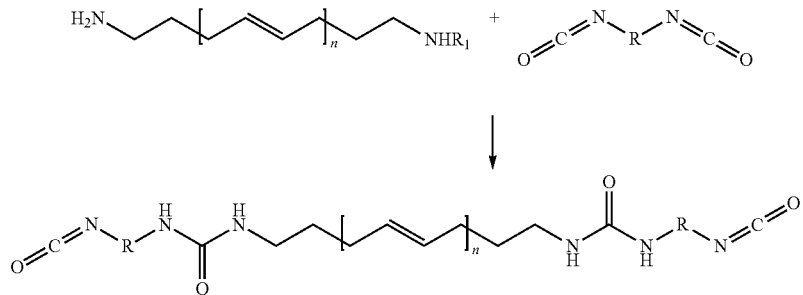

where n is the chain length, i.e., about 1 or greater, and R and $R_1$ are independently straight chains or branched hydrocarbon chains having about 1 to about 20 carbons, a phenyl group, or a mixture thereof.

The amine-terminated component may be blended with other amine-terminated components including, but not limited to, amine-terminated hydrocarbons, amine-terminated polyethers, amine-terminated polyesters, amine-terminated polycarbonates, amine-terminated polycaprolactones, and mixtures thereof.

Hybrid Prepolymer

The prepolymer may also have both urethane and urea linkages. Such a prepolymer is distinct from a polyurethane prepolymer including only an isocyanate and a hydroxy-terminated component or a polyurea prepolymer including only an isocyanate and an amine-terminated component. For the sake of clarity, this type of segment will be referred to as a hybrid prepolymer throughout the application.

For example, in one embodiment, the isocyanate-reactive component may be have at least one terminal hydroxyl group and at least one terminal amino group. In particular, the isocyanate-reactive component may have at least one conjugated diene hydrocarbon terminated at one end with a primary or secondary amino group and terminated at the other end with a primary or secondary hydroxyl group.

In this regard, the hybrid isocyanate-reactive component may have one of the following general formulas:

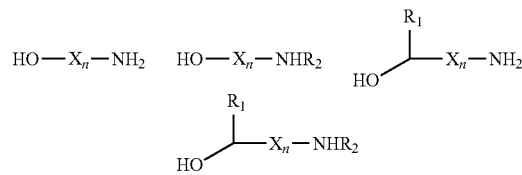

R, $R_1$, and $R_2$ may independently be any alkyl group having from about 1 to about 20 carbon atoms, preferably about 1 to about 12 carbon atoms, a phenyl group, a cyclic group, or mixture thereof. X may be unsubstituted, 2-substituted, or 2,3-disubstituted 1,3-dienes or 4 up to about 12 carbon atoms and n is the chain length, i.e., about 1 or greater. In one embodiment, the diene has up to 6 carbon atoms and the substituents in the 2- and/or 3-position may be H, alkyl, preferably lower alkyl, aryl, halogen, and mixtures thereof. The diene may be 1,3-butadiene, isoprene, 2-cyano-1,3-butadiene, 2,3-dimethyl-1,3,butadiene, 2-phenyl-1,3-butadiene, 2-methyl-3-phenyl-1,3-butadiene, and the like.

When a diisocyanate is reacted with a hybrid isocyanate-reactive component of the present invention, long polymer chains are formed. A general reaction scheme between a diisocyanate and a hybrid isocyanate-reactive component having primary hydroxy and amino groups according to the invention is as follows:

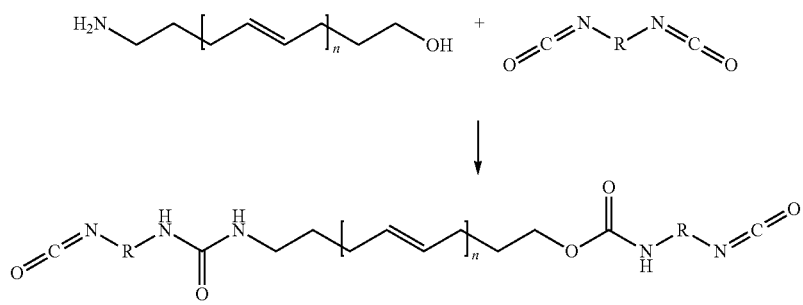

where n is the chain length, i.e., about 1 or greater, and R and $R_1$ are independently straight chains or branched hydrocarbon chains having about 1 to about 20 carbons, a phenyl group, or a mixture thereof.

In addition, when the hybrid isocyanate-reactive component includes a secondary hydroxy group and a primary amino group, the reaction scheme is as follows:

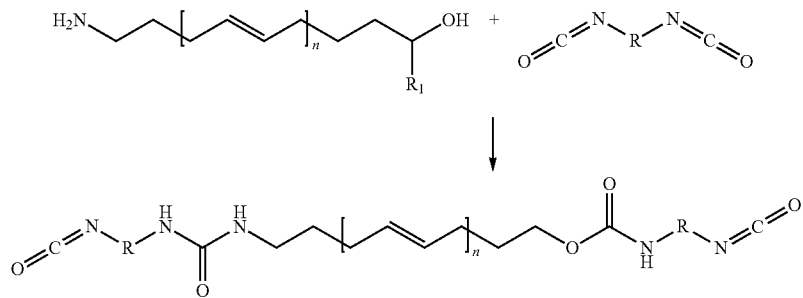

where n is the chain length, i.e., about 1 or greater, and R and $R_1$ are independently straight chains or branched hydrocarbon chains having about 1 to about 20 carbons, a phenyl group, or a mixture thereof.

Furthermore, when the hybrid isocyanate-reactive component includes a primary hydroxy group and a secondary amino group, the reaction scheme is as follows:

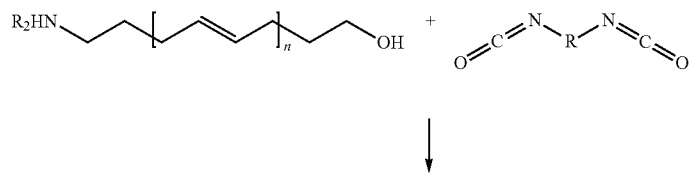

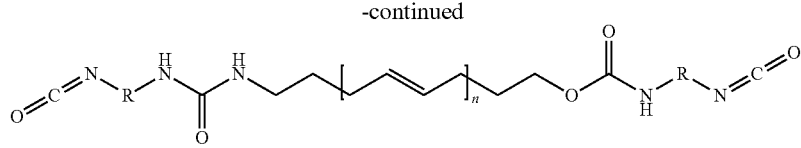

where n is the chain length, i.e., about 1 or greater, and R and $R_2$ are independently straight chains or branched hydrocarbon chains having about 1 to about 20 carbons, a phenyl group, or a mixture thereof.

Moreover, when the hybrid isocyanate-reactive component includes secondary hydroxyl and amino groups, the reaction scheme is as follows:

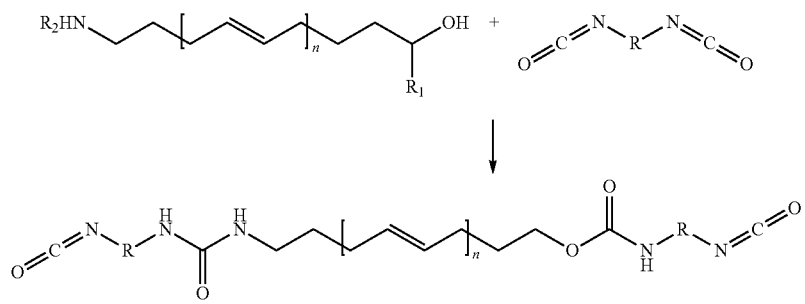

where n is the chain length, i.e., about 1 or greater, and R, $R_1$, and $R_2$ are independently straight chains or branched hydrocarbon chains having about 1 to about 20 carbons, a phenyl group, or a mixture thereof.

Curatives

The prepolymers discussed above may be cured in several ways. In one embodiment, the curing process involves the reaction of the prepolymer with an amine-terminated curing agent, a hydroxy-terminated curing agent, or a mixture thereof. The use of such curing agents promotes crosslinking of the hard segments, i.e., the isocyanate groups and the amino and/or hydroxy groups.

The amine-terminated and/or hydroxy-terminated curing agent(s) may be present in a curative blend with a free radical initiator, such as an organic peroxide to, which crosslinks the soft segments of the prepolymer, i.e., the unsaturated portion of the elastomer. For example, the curative blend is added to the prepolymer and the temperature is elevated such that the soft and hard segments are crosslinked.

Amine-Terminated Curing Agent

The prepolymers of the invention be cured with a single amine-terminated curing agent or a mixture of amine-terminated curing agents. Suitable amine-terminated curing agents include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl)ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-benzene; and derivatives thereof; 1,4-bis-(sec-butylamino)-benzene; 1,2-bis-(sec-butylamino)-benzene; N,N'-dialkylamino-diphenylmethane; trimethyleneglycol-ci-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-ciaminocyclohexylmethane; and mixtures thereof. In one embodiment, the amine-terminated curing agent is 4,4'-bis-(sec-butylamino)-dicyclohexylmethane.

The amine-terminated curing agent may have a molecular weight of about 64 or greater. In one embodiment, the molecular weight of the amine-curing agent is about 2000 or less. In addition, any of the amine-terminated moieties listed above for use as the isocyanate-reactive component to form the prepolymer may be used as curing agents to react with the prepolymers.

Of the list above, the saturated amine-terminated curing agents suitable for use with the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; triethanolamine; monoisopropanolamine, diisopropanolamine; triisopropanolamine; isophoronediamine; N,N'-diisopropylisophorone diamine and mixtures thereof.

In one embodiment, the curative used with the prepolymer include 3,5-dimethylthio-2,4-toluenediamine,3,5-dimethyl-thio-2,6-toluenediamine, 4,4'-bis-(sec-butylamino)-diphenylmethane, N,N'-diisopropyl-isophorone diamine; polyoxypropylene diamine; propylene oxide-based triamine; 3,3'-dimethyl-4,4'-diaminocyclohexylmethane; and mixtures thereof.

Because unhindered primary diamines result in a rapid reaction between the isocyanate groups and the amine groups, in certain instances, a hindered secondary diamine may be more suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (Clearlink 1000) may be suitable for use in combination with an isocyanate to form the polyurea prepolymer. In addition, N,N'-diisopropyl-isophorone diamine, available from Huntsman Corporation under the tradename Jefflink, may be used as the secondary diamine curing agent.

In addition, a trifunctional curing agent can be used to help improve cross-linking and, thus, to further improve the shear resistance of the resulting polyurea elastomers. In one embodiment, a triol such as trimethylolpropane or a tetraol such as N,N,N',N'-tetrakis (2-hydroxylpropyl)ethylenediamine may be added to the formulations.

Hydroxy-Terminated Curing Agent

The prepolymers of the invention may also be cured with a single hydroxy-terminated curing agent or a mixture of hydroxy-terminated curing agents. Suitable hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N'N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; polytetramethylene ether glycol, preferably having a molecular weight ranging from about 250 to about 3900; resorcinol-di-(beta-hydroxyethyl)ether and its derivatives; hydroquinone-di-(beta-hydroxyethyl)ether and its derivatives; 1,3-bis-(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; N,N-bis(.beta.-hydroxypropyl)aniline; 2-propanol-1,1'-phenylaminobis; and mixtures thereof.

The hydroxy-terminated curing agent may have a molecular weight of at least about 50. In one embodiment, the molecular weight of the hydroxy-terminated curing agent is about 2000 or less. In yet another embodiment, the hydroxy-terminated curing agent has a molecular weight of about 250 to about 3900. It should be understood that molecular weight, as used herein, is the absolute weight average molecular weight and would be understood as such by one of ordinary skill in the art.

The saturated hydroxy-terminated curing agents, included in the list above, are preferred when making a light stable composition. Those saturated hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; polytetramethylene ether glycol having molecular weight ranging from about 250 to about 3900; and mixtures thereof.

Free Radical Initiator

The free radical initiator promotes crosslinking of the unsaturated segments of the prepolymer, i.e., the conjugated diene hydrocarbon. In one embodiment, the free radical initiator includes a peroxide. The peroxide is not specifically limited, however, suitable peroxides for use in the vulcanization process include, but are not limited to, the following:

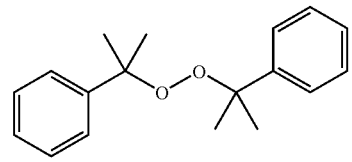

dicumyl peroxide,

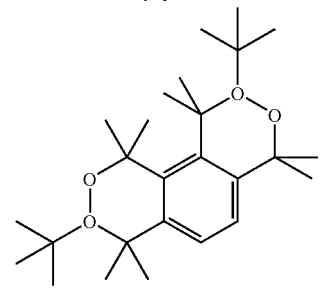

α-α-bis(t-butyl peroxy) diisopropylbenzene, and mixtures thereof. In addition, di-t-amyl peroxide, 1,1-bis(t-butylperoxy)-3,3,5-trimethylcyclohexane or 1,1-di(t-butylperoxy) 3,3,5-trimethyl cyclohexane, di-t-butyl peroxide, 2,5-di-(t-butylperoxy)-2,5-dimethyl hexane, 2,5-dimethyl-2,5-di-benzoylperoxyhexane, n-butyl-4,4-bis(t-butylperoxy) valerate, lauryl peroxide, benzoyl peroxide, t-butyl hydroperoxide, t-butyl cumylperoxide, t-butyl peroxybenzoate, 2,4-dichloro-benzoyl peroxide, and mixtures thereof are contemplated for use in curing the unsaturated soft segments in the prepolymer.

It is well known that peroxides are available in a variety of forms having different activity. The activity is typically defined by the "active oxygen content." For example, DI-CUP® 40C, commercially available from GEO Specialty Chemicals of Gibbstown, N.J., is 40 percent active. The peroxide is typically present in an amount greater than about 0.1 parts per hundred of the composition, preferably about 0.1 to 15 parts per hundred of the composition, and more preferably about 0.2 to 5 parts per hundred of the composition. If the peroxide is present in pure form, it is preferably present in an amount of at least about 0.25 pph, more preferably between about 0.35 pph and about 2.5 pph, and most preferably between about 0.5 pph and about 2 pph per hundred of the composition. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pph of a pure peroxide is equivalent 4 pph of a concentrate peroxide that is 50 percent active (i.e., 2 divided by 0.5=4).

In addition to peroxides, other free radical sources suitable for use with the present invention include persulfates, azo compounds, benzophenones, hydrazides, and combinations thereof are contemplated for use as part of the cure system for the dipolymer. In this aspect of the invention, the amount of free radical source is about 5 pph or less, preferably about 3 pph or less, more preferably about 2.5 pph or less, and even more preferably about 2 pph or less per hundred of the composition. In still another embodiment, the amount of free radical source is about 1 pph or less, preferably about 0.75 pph or less per hundred of the composition.

Curative Blends

The amine-terminated and hydroxy-terminated curing agents may be present in a blend with the free radical initiator. For example, in one embodiment, the curative blend includes at least one amine-terminated curing agent and a free radical initiator. In another embodiment, the curative blend is a mixture of at least one hydroxy-terminated curing agent and a free radical initiator. In yet another embodiment, the curative blend includes at least one hydroxy-terminated curing agent, at least one amine-terminated curing agent, and a free radical initiator.

Furthermore, the curative blend may include a freezing point depressing agent to slow the onset of solidification.

Forming the Compositions of the Invention

There are two basic techniques used to process the compositions of the invention: the one-shot technique and the prepolymer technique. The one-shot technique reacts the isocyanate-containing component and the isocyanate-reactive component, and the curing agent or curative blend in one step, whereas the prepolymer technique requires a first reaction between the isocyanate-reactive component(s) and an isocyanate to produce the prepolymer, and a subsequent reaction between the prepolymer and a curing agent or curative blend. Either method may be employed to produce the compositions of the invention, however, the prepolymer technique is preferred because it provides better control of chemical reaction and, consequently, results in more uniform properties for the elastomers.

In particular, whether the curative is a single amine-terminated curing agent and/or hydroxy-terminated curing agent, a mixture of amine-terminated curing agent(s) and/or hydroxy-terminated curing agent(s), or a blend of amine-terminated curing agent(s) and/or hydroxy-terminated curing agent(s) and a free radical initiator, once reacted with the prepolymer, the isocyanate (NCO) groups react with the hydroxyl or amino groups to crosslink the prepolymer.

For example, when a urethane prepolymer reacts with a curing agent or curative blend including hydroxy-terminated components, the resulting polymer includes urethane linkages, as shown in the following general reaction scheme:

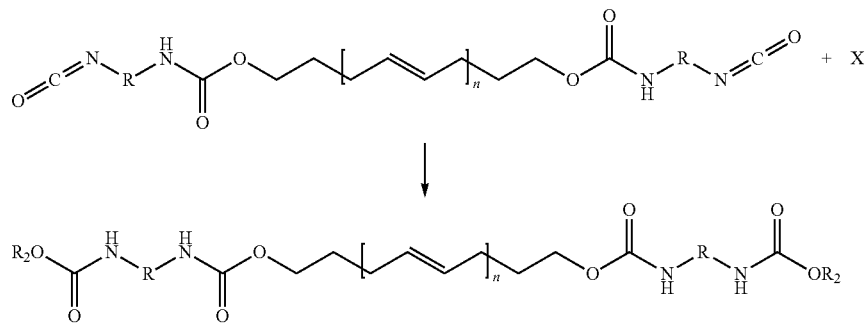

Examples of freezing point depressing agents suitable for use in this aspect of the invention are disclosed in U.S. Patent Publication No. 2003/0212240, which is incorporated by reference herein in its entirety. In one embodiment, the freezing point depressing agent includes, but is not limited to, ethylene diamine, 1,3-diaminopropane, dimethylamino propylamine, tetraethylene pentamine, 1,2-propylenediamine, diethylaminopropylamine, 2,2,4-trimethyl-1,6-hexanediamine, 2,4,4-trimethyl-1,6-hexanediamine, and mixtures thereof.

where n is the chain length, i.e., about 1 or greater, X is a curing agent or curative blend including hydroxy groups, R and $R_2$ are independently straight chains or branched hydrocarbon chains having about 1 to about 20 carbons, a phenyl group, or a mixture thereof.

When a urea prepolymer reacts with a curing agent or curative blend including amine-terminated components, the resulting polymer includes urea linkages, as shown in the following general reaction scheme:

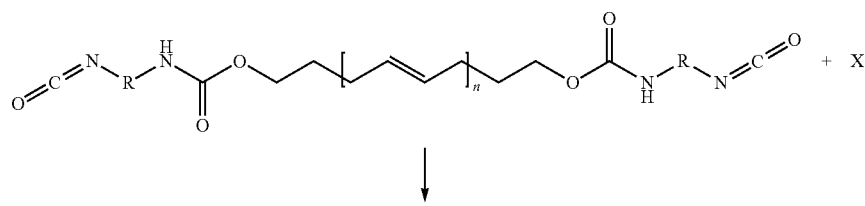

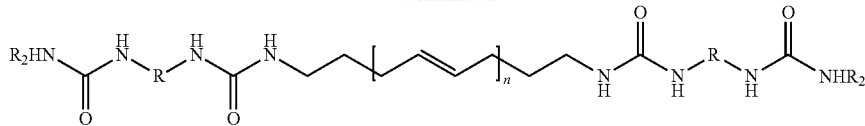

where n is the chain length, i.e., about 1 or greater, X is a curing agent or curative blend including amino groups, R and $R_2$ are independently straight chains or branched hydrocarbon chains having about 1 to about 20 carbons, a phenyl group, or a mixture thereof.

When a hybrid prepolymer reacts with a curing agent or curative blend including hydroxy-terminated or amine-terminated components, the resulting polymer includes urea and urethane linkages, as shown in the following general reaction scheme:

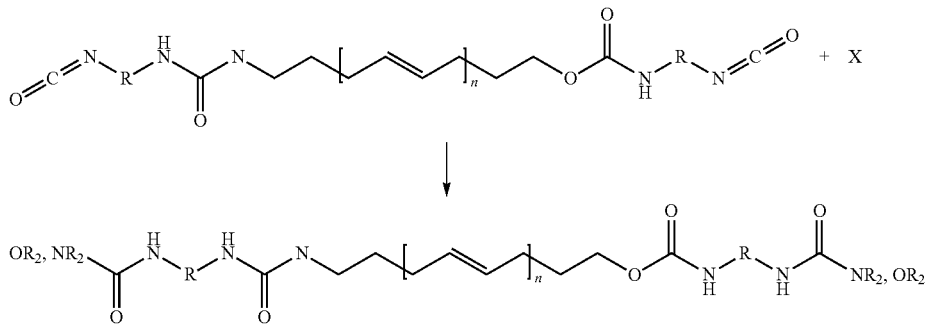

where n is the chain length, i.e., about 1 or greater, X is a curing agent or curative blend including hydroxy groups, amino groups, or combinations thereof, R and $R_2$ are independently straight chains or branched hydrocarbon chains having about 1 to about 20 carbons, a phenyl group, or a mixture thereof.

Those of ordinary skill in the art would be aware of the similar general reaction schemes relating to the reaction between a urethane prepolymer and a curing agent or curative blend including amino groups and a urea prepolymer and a curing agent or curative blend including hydroxy groups. As discussed above, similar to a polymer resulting from the use of a hybrid prepolymer, the resulting polymer in these reactions will also include both urethane and urea linkages.

When the curative blend includes a free radical initiator, both the soft and hard segments of the polymer are crosslinked. In on embodiment, the prepolymer and curative blend are mixed and poured into a mold. The temperature of the mold preferably ranges from about 100° F. to about 250° F. In one embodiment, the mold temperature ranges from about 120° F. to about 200° F. In another embodiment, the temperature of the mold ranges from about 140° F. to about 180° F. In still another embodiment, the mold temperature is about 150° F. to about 170° F. After a period of time, the mold temperature is elevated to initiate the free radical. In one embodiment, the period of time prior to elevation ranges from about 1 minute to about 30 minutes. In another embodiment, the period of time prior to elevation ranges from about 5 minutes to about 20 minutes, preferably about 8 minutes to about 15 minutes. After elevation, the material may be allowed to cure for an additional period of time ranging from about 5 minutes to about 25 minutes, preferably about 8 minutes to about 20 minutes, and even more preferably about 12 minutes to about 18 minutes.

The elevation temperature may be any temperature that initiates the free radical. For example, the elevation temperature may range from about 250° F. to about 400° F. In one embodiment, the elevation temperature may range from about 275° F. to about 350° F. In another embodiment, the elevation temperature ranges from about 300° F. to about 330° F.

The reaction scheme between a polyurethane prepolymer and a curative blend including hydroxy groups and a free radical initiator, such as an organic peroxide, is as follows:

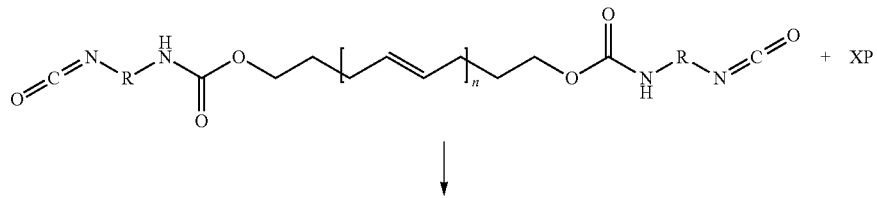

-continued

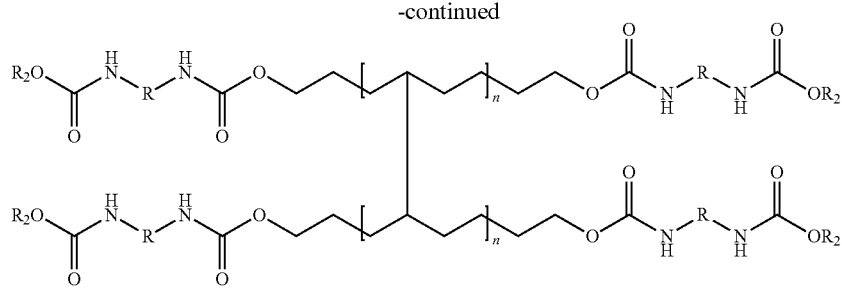

where n is the chain length, i.e., about 1 or greater, XP is a curative blend including hydroxy groups and an organic peroxide, R and $R_2$ are independently straight chains or branched hydrocarbon chains having about 1 to about 20 carbons, a phenyl group, or a mixture thereof.

When a urea prepolymer reacts with a curing agent or curative blend including amino groups and a free radical initiator, such as an organic peroxide, the resulting polymer includes urea linkages, as shown in the following general reaction scheme:

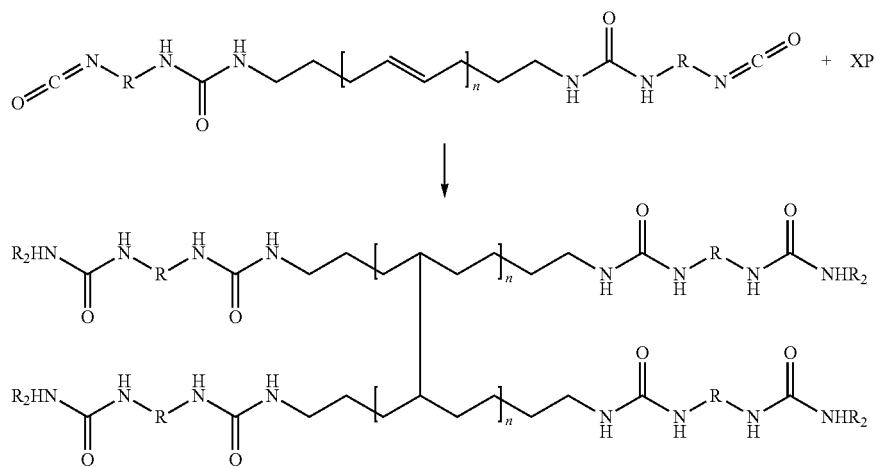

where n is the chain length, i.e., about 1 or greater, XP is a curative blend including amino groups and an organic peroxide, R and $R_2$ are independently straight chains or branched hydrocarbon chains having about 1 to about 20 carbons, a phenyl group, or a mixture thereof.

When a hybrid prepolymer reacts with a curing agent or curative blend including hydroxy-terminated or amine-terminated components, the resulting polymer includes urea and urethane linkages, as shown in the following general reaction scheme:

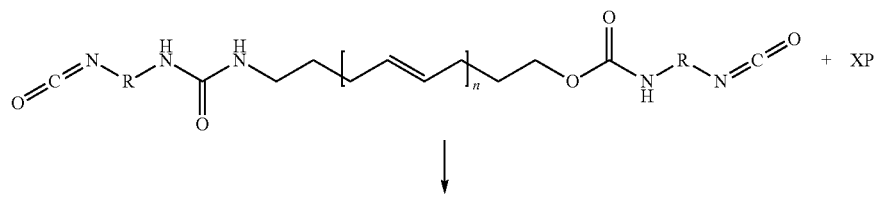

-continued

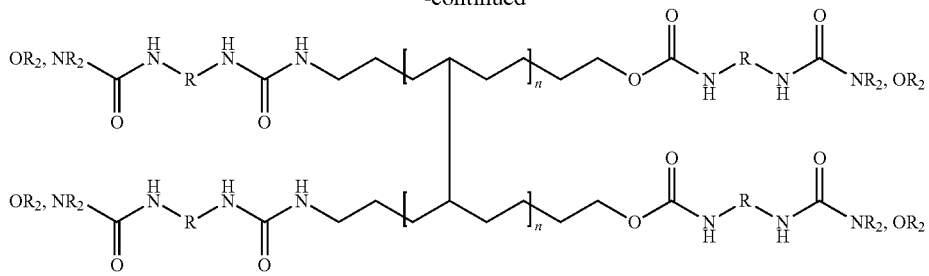

where n is the chain length, i.e., about 1 or greater, XP is a curative blend including hydroxy groups, amino groups, or combinations thereof, and an organic peroxide, R and $R_2$ are independently straight chains or branched hydrocarbon chains having about 1 to about 20 carbons, a phenyl group, or a mixture thereof.

Blends

The compositions of the present invention may also be blended with other polymers. In particular, the compositions of the invention preferably include about 1 percent to about 100 percent of the crosslinked polyurethane/polyurea. In one embodiment, the compositions contain about 10 percent to about 90 percent of the crosslinked polyurethane/polyurea, preferably from about 10 percent to about 75 percent of the crosslinked polyurethane/polyurea, and about 90 percent to 10 percent, more preferably from about 90 percent to about 25 percent of the second polymer component and/or other materials as described below. For example, a blend in accordance in the present invention may have about 10 percent to about 40 percent of the crosslinked polyurethane/polyurea and about 60 percent to about 90 percent of another thermoplastic polymer, e.g., a conventional ionomer. In an alternate embodiment, a blend in accordance with the invention may include about 40 percent to about 80 percent of the crosslinked polyurethane/polyurea and about 20 percent to about 60 percent of another thermoplastic polymer. Unless otherwise stated herein, all percentages are given in percent by weight of the total composition of the golf ball layer in question.

For example, the compositions of the invention may be present in a blend with ionomeric copolymers or terpolymers, ionomeric precursors, thermoplastics, polyamides, polycarbonates, polyesters, polyurethanes, polyureas, thermoplastic elastomers, polybutadiene rubber, balata, grafted and non-grafted metallocene-catalyzed polymers, single-site polymers, high-crystalline acid polymers, cationic polymers, cationic and anionic urethane ionomers and urethane epoxies, polyurethane ionomers, polyurea ionomers, epoxy resins, polyethylenes, polyacrylin, siloxanes, and mixtures thereof.

Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention that are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety.

One of ordinary skill in the art would be well aware of methods to blend these polymeric materials with the organically modified silicate of the invention to form a composition for use in golf ball layers.

Additives

The compositions of the invention may include a variety of additives. For example, the compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethyl-ene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Fillers may also be added to the compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

When the compositions of the invention are used in the core layers of the golf ball, fillers may also be used to modify the weight of the core to create a specialty ball, e.g., a lower weight ball is preferred for a player having a low swing speed.

Additional materials conventionally included in other golf ball compositions may also be included in the compositions of the invention. For example, antioxidants, stabilizers, softening agents, plasticizers, including internal and external plasticizers, reinforcing materials, and compatibilizers may also be added to any composition of the invention. Those of ordinary skill in the art are aware of the purpose of these additives and the amounts that should be employed to fulfill those purposes.

Golf Ball Construction

As discussed briefly above, the compositions of the present invention may be used with any type of ball construction including, but not limited to, one-piece, two-piece, three-piece, and four-piece designs, a double core, a double cover, an intermediate layer(s), a multilayer core, and/or a multilayer cover depending on the type of performance desired of the ball. That is, the compositions of the invention may be used in a core, an intermediate layer, and/or a cover of a golf ball, each of which may have a single layer or multiple layers.

As used herein, the term "multilayer" means at least two layers. For instance, the core may be a one-piece core or a multilayer core, i.e., a core that has an innermost component with an additional core layer or additional core layers disposed thereon. As used herein, the terms "core" and "center" are generally used interchangeably to reference the innermost component of the ball. In some embodiments, however, the term "center" is used when there are multiple core layers, i.e., a center and an outer core layer.

When the golf ball of the present invention includes an intermediate layer, which may also include more than one layer, this layer may be incorporated with a single or multi-layer cover, a single or multi-piece core, with both a single layer cover and core, or with both a multilayer cover and a multilayer core. The intermediate layer may be also be referred to as an inner cover layer or outer core layer, or any other layer(s) disposed between the inner core and the outer cover of a golf ball.

Referring to FIG. 1, a golf ball 2 of the present invention can include a center 4 and a cover 6 surrounding the center 4. While dimensions and materials are discussed in more detail below, a golf ball of the invention can include a large core, e.g., about 1.55 inches to about 1.60 inches, and a relatively soft, thin cover formed from the composition of the invention.

Figure 2:
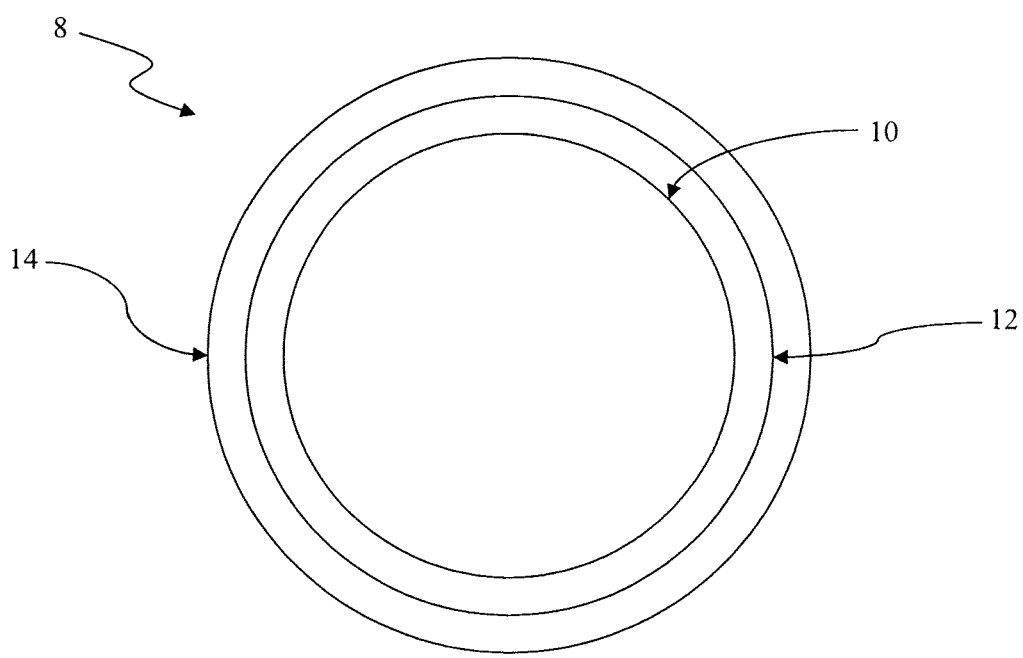
FIG. 2 is a cross-sectional view of a multi-component golf ball, wherein at least one layer is formed from a composition of the invention.

Referring to FIG. 2, a golf ball 8 of the present invention can include a center 10, a cover 14, and at least one intermediate layer 12 disposed between the cover and the center. In one embodiment, the intermediate layer 12 is formed from the composition of the invention. In another embodiment, the cover 14 is formed from the composition of the invention. Each of the cover and center layers in FIG. 1 or 2 may include more than one layer, i.e., the golf ball can be a conventional three-piece wound ball, a two-piece ball, a ball having a multi-layer core and an intermediate layer or layers, etc.

Figure 3:
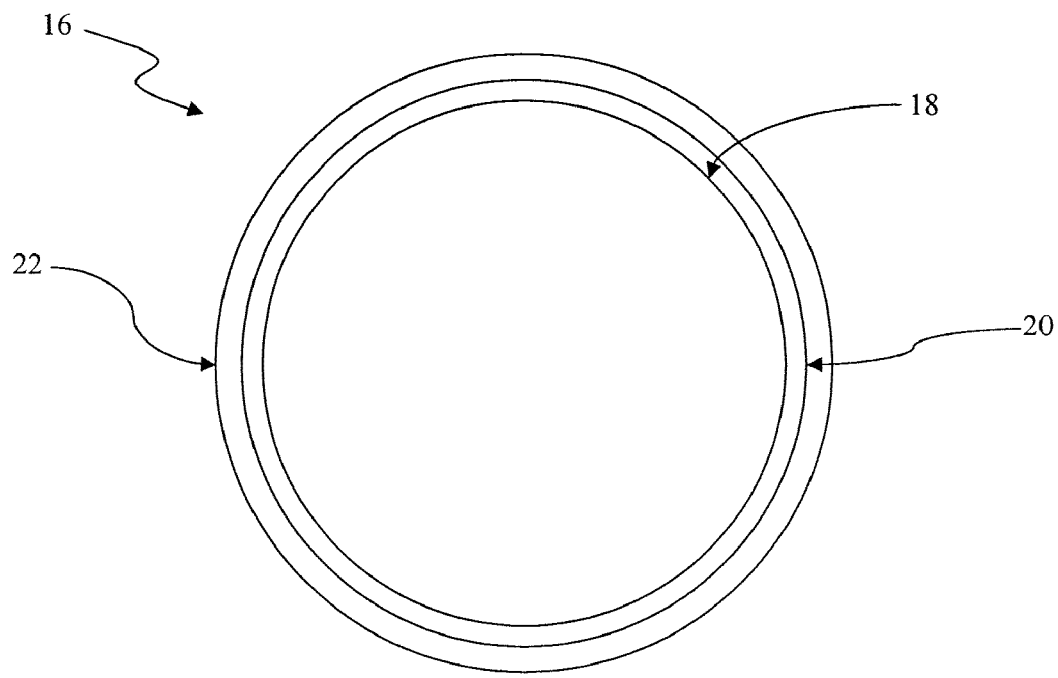
FIG. 3 is a cross-sectional view of a multi-component golf ball having a large core, wherein at least one layer is formed from a composition of the invention.

Also, FIG. 3 shows a golf ball 16 of the present invention including a large core 18, a cover 22, and an inner cover layer 20. In one embodiment, the core 18 includes a center and an outer core layer. The inner cover layer 20 and/or cover 22 may be formed from the composition of the invention. In one embodiment, the inner cover layer 20 is formed from the composition of the invention and the cover 22 is formed from a polyurethane or polyurea material.

Figure 4:
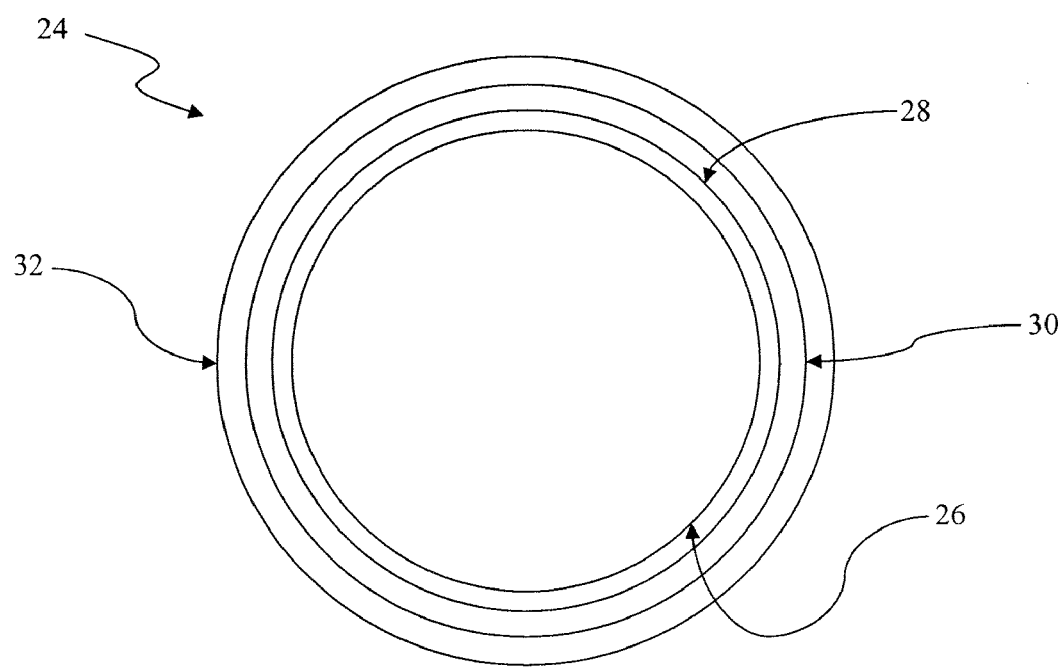
FIG. 4 is a cross-sectional view of a multi-component golf ball including a dual core and a dual cover, wherein at least one layer is formed from a composition of the invention.

In another embodiment, as shown in FIG. 4, a golf ball 24 of the present invention can include a large core having a center 26 and an intermediate layer 28 disposed underneath a dual cover having an inner cover layer 30 and an outer cover layer 32. The inner cover layer 30 and/or outer cover layer 32 is formed from the compositions of the invention. Further, any of the figures detailed herein may include embodiments wherein an optional wound layer is disposed between the center and the core of the golf ball.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Golf Ball Core Layer(s)

The cores of the golf balls formed according to the invention may be solid, semi-solid, hollow, fluid-filled or powder-filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like.

The core may have a diameter of about 1.5 inches to about 1.62 inches and the cover layer thickness may range from about 0.03 inches to about 0.06 inches. The core compression preferably ranges from about 30 to about 120 atti and the overall ball compression is about 50 to about 110.

Any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. For example, butadiene rubber, which, in an uncured state, typically has a Mooney viscosity (measured according to ASTM D1646-99) greater than about 20, preferably greater than about 30, and more preferably greater than about 40, may be used in one or more core layers of the golf balls prepared according to the present invention. In addition, the compositions of the invention may be incorporated the core.

A free-radical source, often alternatively referred to as a free-radical initiator, may optionally be used in the core, or one or more layers of the golf balls according to the invention, particularly when a polymer component includes a thermoset material. The free radical source for is preferably a peroxide, more preferably an organic peroxide. The peroxide is typically present in an amount greater than about 0.1 parts per hundred of the total polymer component, preferably about 0.1 to 15 parts per hundred of the polymer component, and more preferably about 0.2 to 5 parts per hundred of the total polymer component. It should be understood by those of ordinary skill in the art that the presence of certain components may require a larger amount of free-radical source than the amounts described herein. The free radical source may alternatively or additionally be one or more of an electron beam, UV or gamma radiation, x-rays, or any other high energy radiation source capable of generating free radicals. It should be further understood that heat often facilitates initiation of the generation of free radicals when peroxides are used as a free-radical initiator.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer may be formed from the composition of the invention. For example, an intermediate layer or inner cover layer having a thickness of about 0.015 inches to about 0.06 inches may be disposed about a core. In this aspect of the invention, the core, which has a diameter ranging from about 1.5 inches to about 1.59 inches, may also be formed from a composition of the invention or, in the alternative, from a conventional rubber composition. The inner ball may be covered by a castable thermoset or injection moldable thermoplastic material or any of the other cover materials discussed below. In this aspect of the invention, the cover may have a thickness of about 0.02 inches to about 0.045 inches, preferably about 0.025 inches to about 0.04 inches. The core compression is about 30 to about 110 atti, preferably about 50 to about 100 atti, and the overall ball compression preferably ranges from about 50 to about 100 atti.

When not formed from the composition of the invention, the intermediate layer may be formed from a number of thermoplastic and thermosetting materials. For example, the intermediate layer(s) may be formed, at least in part, from one or more homopolymeric or copolymeric materials, such as ionomers, primarily or fully non-ionomeric thermoplastic materials, vinyl resins, polyolefins, polyurethanes, polyureas, such as those disclosed in U.S. Pat. No. 5,484,870, polyamides, acrylic resins and blends thereof, olefinic thermoplastic rubbers, block copolymers of styrene and butadiene, isoprene or ethylene-butylene rubber, copoly(ether-amide), such as PEBAX, sold by Atofina Chemicals, Inc. of Philadelphia, Pa., polyphenylene oxide resins or blends thereof, and thermoplastic polyesters.

For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

The intermediate layer may also include a wound layer formed from a tensioned thread material. The thread may be single-ply or may include two or more plies. Suitable thread materials include, but are not limited to, fiber, glass, carbon, polyether urea, polyether block copolymers, polyester urea, polyester block copolymers, syndiotactic- or isotactic-poly (propylene), polyethylene, polyamide, poly(oxymethylene), polyketone, poly(ethylene terephthalate), poly(p-phenylene terephthalamide), poly(acrylonitrile), diaminodicyclohexyl-methane, dodecanedicarboxylic acid, natural rubber, polyisoprene rubber, styrene-butadiene copolymers, styrene-propylene-diene copolymers, another synthetic rubber, or block, graft, random, alternating, brush, multi-arm star, branched, or dendritic copolymers, or mixtures thereof. Those of ordinary skill in the art are aware of the process for producing thread materials for use with the present invention.

Golf Ball Cover Layer(s)

The cover provides the interface between the ball and a club. Properties that are desirable for the cover are good moldability, high abrasion resistance, high impact resistance, high tear strength, high resilience, and good mold release, among others. The cover layer may be formed, at least in part, from a composition of the invention. For example, the present invention contemplates a golf ball having a large core of polybutadiene and a thin cover formed from the composition of the invention.

When the compositions of the invention are incorporated into a core or intermediate/inner cover layer, however, the cover may be formed from one or more homopolymeric or copolymeric materials as discussed in the section above pertaining to the intermediate layer. The cover may also be at least partially formed from a polybutadiene reaction product, as discussed above with respect to the core. Golf balls according to the invention may also be formed having a cover of polyurethane, polyurea, and polybutadiene materials discussed in U.S. Pat. No. 6,835,794.

For example, the cover may be formed from the reaction product of an isocyanate and a hydroxy-terminated component that is cured with a curing agent to form a polyurethane. In another embodiment, the cover is formed from a reaction product of an isocyanate and an amine-terminated component that is cured with a curing agent to form a polyurea.

Layer Formation

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

Cores of the golf balls of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer and/or cover layer may also be formed using any suitable method known to those of ordinary skill in the art. For example, an intermediate layer may be formed by blow molding and covered with a dimpled cover layer formed by injection molding, compression molding, casting, vacuum forming, powder coating, and the like.

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Furthermore, the resultant golf balls prepared according to the invention typically will have dimple coverage greater than about 60 percent, preferably greater than about 65 percent, and more preferably greater than about 70 percent.

Golf Ball Post-Processing

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

Any of the golf ball layers may be surface treated by conventional methods including blasting, mechanical abrasion, corona discharge, plasma treatment, and the like, and combinations thereof. In fact, because low surface energy, or surface tension, is a key feature of polysiloxanes, layers formed from the compositions of the invention may be surface treated according to U.S. Patent Publication No. 2003/0199337, the disclosure of which is incorporated in its entirety by reference herein.

Golf Ball Properties

The properties such as core diameter, intermediate layer and cover layer thickness, hardness, and compression have been found to effect play characteristics such as spin, initial velocity and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches (43 mm) to about 1.740 inches (44 mm) is most preferred, however diameters anywhere in the range of from 1.700 to about 1.950 inches can be used.

Preferably, the overall diameter of the core and all intermediate layers is about 80 percent to about 98 percent of the overall diameter of the finished ball. The core may have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches. In one embodiment, the core diameter is about 1.59 inches or greater. In another embodiment, the diameter of the core is about 1.64 inches or less.

When the core includes an inner core layer and an outer core layer, the inner core layer is preferably about 0.5 inches or greater and the outer core layer preferably has a thickness of about 0.1 inches or greater. For example, when part of a multi-layer ball according to invention, the center may have a diameter ranging from about 0.5 inches to about 1.30 inches and the outer core layer may have a diameter ranging from about 0.12 inches to about 0.5 inches. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.12 inches, preferably about 0.1 inches or less. For example, when part of a two-piece ball according to invention, the cover may have a thickness ranging from about 0.03 inches to about 0.09 inches. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, or a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. For example, when part of a three-piece ball or multi-layer ball according to invention, the intermediate layer and/or inner cover layer may have a thickness ranging from about 0.015 inches to about 0.06 inches. In another embodiment, the intermediate layer thickness is about 0.05 inches or less, more preferably about 0.01 inches to about 0.045 inches.

Hardness

Because the compositions of the invention may be used in any layer of a golf ball, the golf ball construction, physical properties, and resulting performance may vary greatly depending on the layer(s) of the ball that include the compositions of the invention.

The cores included in golf balls of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D. For example, when a core is formed from the composition of the invention, the core may have a hardness of about 40 Shore to about 50 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. For example, when an intermediate layer is formed from the composition of the invention, the hardness of the intermediate layer may be about 65 Shore D or less, preferably ranging from about 35 Shore D to about 60 Shore D. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater. For example, a golf ball of the invention may include an inner cover formed from a rosin-modified polymeric composition of the invention having a hardness of about 60 Shore D to about 75 Shore D.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 60 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

Compression

Compression values are dependent on the diameter of the component being measured. The Atti compression of the core, or portion of the core, of golf balls prepared according to the invention may range from about 30 to about 110 atti, preferably about 50 to about 100 atti. In one embodiment, the core compression is less than about 80, preferably less than about 75. As used herein, the terms "Atti compression" or "compression" are defined as the deflection of an object or material relative to the deflection of a calibrated spring, as measured with an Atti Compression Gauge, which is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 50 to 100. In yet another embodiment, the compression of the golf balls of the invention is about 75 or greater and about 95 or less. For example, a preferred golf ball of the invention may have a compression from about 80 to about 95.

Coefficient of Restitution

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Alternatively, the maximum COR of the ball is one that does not cause the golf ball to exceed initial velocity requirements established by regulating entities such as the USGA. As used herein, the term "coefficient of restitution" (CoR) is calculated by dividing the rebound velocity of the golf ball by the incoming velocity when a golf ball is shot out of an air cannon. The COR testing is conducted over a range of incoming velocities and determined at an inbound velocity of 125 ft/s. Another measure of this resilience is the "loss tangent," or tan $\delta$, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked material should be less than about 50,000 N/m at $-50°$ C. Preferably, the dynamic stiffness should be between about 10,000 and 40,000 N/m at $-50°$ C., more preferably, the dynamic stiffness should be between about 20,000 and 30,000 N/m at $-50°$ C.

Moisture Vapor Transmission

The moisture vapor transmission of a golf ball portion formed from the compositions of the invention may be expressed in terms of absorption, e.g., weight gain or size gain over a period of time at a specific conditions, and transmission, e.g., moisture vapor transmission rate (MVTR) according to ASTM E96-00. MVTR refers to the mass of water vapor that diffused into a material of a given thickness per unit area per unit time at a specific temperature and humidity differential. For example, weight changes of a golf ball portion monitored over a period of seven weeks in 100 percent relative humidity and 72° F. help to demonstrate which balls have better water resistance.

In one embodiment, the golf ball portions of the invention have a weight gain of about 15 grams per 100 in$^2$ per day or less at 38° C. and 90 percent relative humidity. In another embodiment, the golf balls of the invention have a weight gain of about 12.5 grams per 100 in$^2$ per day or less. In still another embodiment, the weight gain of the golf balls of the invention is about 7 grams per 100 in$^2$ per day or less. In yet another embodiment, the weight gain is about 5 grams per 100 in$^2$ per day or less. The golf balls of the invention preferably have a weight gain of about 3 grams per 100 in$^2$ per day or less.

Size gain may also be used as an indicator of water resistance. That is, the more water a golf ball takes on, the larger a golf ball becomes due to the water enclosed beneath the outermost layer of the golf ball portion. Thus, the golf balls of the invention preferably have no appreciable size gain. In one embodiment, the size gain of the golf balls of the invention after a seven-week period is about 0.001 inches or less.

EXAMPLES

The following examples are only representative of the methods and materials for use in golf ball compositions and golf balls of this invention, and are not to be construed as limiting the scope of the invention in any way.

Example 1

Hydrophobic Covers Formed of the Compositions of the Invention

Hydrophobic compositions were formed according to the invention as shown below in Table 1. In particular, Prepolymer A is a urea prepolymer and Prepolymer B is a urethane prepolymer. The curative is a very low molecular weight trifunctional caprolactone polyol, in which all of the hydroxy groups are primary.

TABLE 1

|  | Formulation #1 | Formulation #2 |
|---|---|---|
| Prepolymer A[1] | 1 eq. |  |
| Prepolymer B[2] |  | 1 eq. |
| Curative[3] | 0.95 eq. | 0.95 eq. |
| White Dispersion | 4.5% | 4.5% |
| Material Hardness (Shore D) | 42 | 44 |

[1]Prepolymer A is a reaction product of H12MDI and an amine-terminated polybutadiene with a molecular weight of 2000 and amine functionality of 2.0.
[2]Prepolymer B is a reaction product of H12MDI and an hydroxy-terminated polybutadiene with a molecular weight of 2000 and hydroxy functionality of 2.0.
[3]The curative is a TMP initiated polycaprolactone with 3.0 functionality and a molecular weight of 300 (CAPA ® 3031 from Solvay).

The formulations were cast as covers conventional polybutadiene cores. In particular, Formulation #1 was used to form Invention Ball #1 and Formulation #2 was used to form Invention Ball #2. Control ball #1 was formed with a polybutadiene core, an ionomer casing layer, and a polyurethane outer cover layer, where the polyurethane has a material hardness of 48 Shore D. Control ball #2 was formed with a large polybutadiene core and an ionomer outer cover layer, where the material hardness of ionomer is 65 Shore D. The balls were tested for coefficient of restitution, impact resistance, and durability. The results are shown in Table 2 below.

TABLE 2

|  | Invention #1 | Invention #2 | Control #1 | Control #2 |
|---|---|---|---|---|
| Pole/Equator Average | 1.682/1.679 | 1.679/1.677 | 1.684/1.680 | 1.680/1.681 |
| Weight (g) | 1.613 | 1.616 | 1.649 | 1.604 |
| COR (@ 125 ft/s) | 0.762 | 0.758 | 0.773 | 0.803 |
| Shear Resistance Rating | 1 | 1 | 1 | 0 |

The balls were also tested for hydrophobicity or moisture resistance. In particular, six molded balls for each category, i.e., Invention #1, Invention #2, Control #1, and Control #2, were placed in a one gallon can filled with water. The balls remained submerged for a four-week period. Weight gain and loss of coefficient of restitution measurements were taken weekly.

Figure 5:
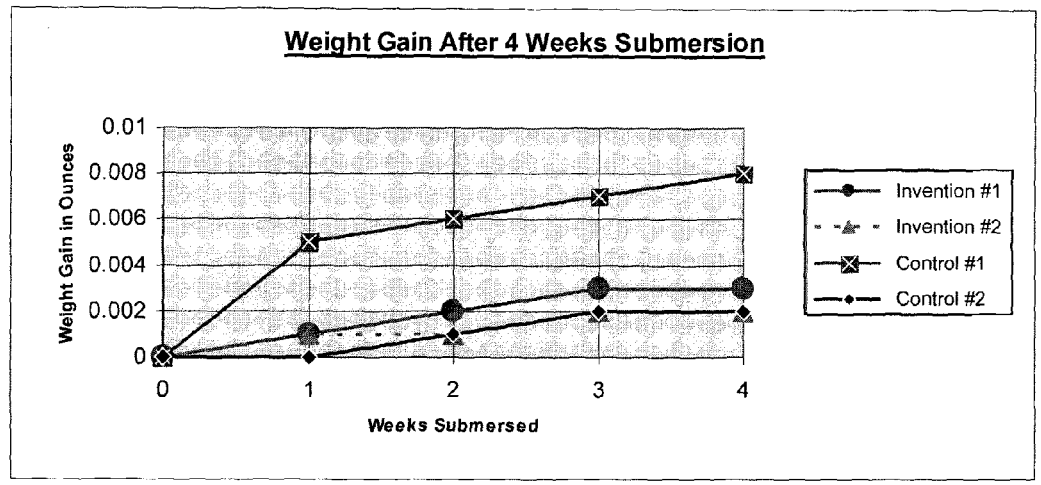
FIG. 5 is a graphical illustration of the weight gain of golf balls of the invention over a four week period of submersion in water.
Figure 6:
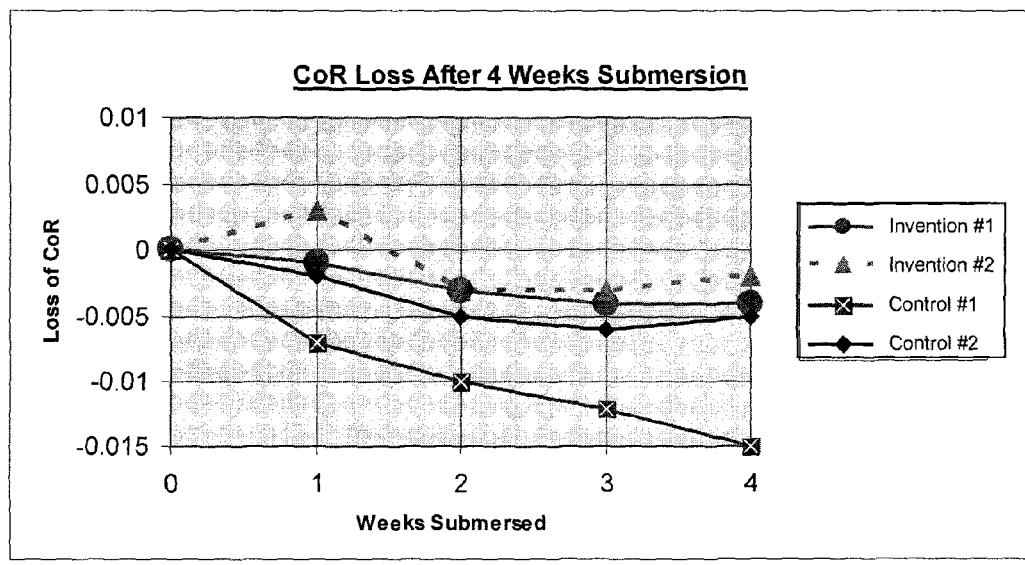
FIG. 6 is a graphical illustration of loss of COR of golf balls of the invention after a four week period of submersion in water.

As shown in FIGS. 5 and 6, after four weeks of submersion, the golf balls formed from both experimental formulations had superior hydrophobicity versus the Control #1 and comparable hydrophobicity to Control #2. In addition, golf balls having covers cast from the experimental formulations showed a smaller loss of COR than both of the control balls.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("Mn") or weight average molecular weight ("Mw"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising a core and a cover, wherein the cover is formed from a composition comprising:
    a prepolymer comprising the reaction product of an isocyanate-containing component and a first isocyanate-reactive component, wherein the first isocyanate-reactive component comprises a conjugated diene hydrocarbon comprising at least two amino groups; and
    a curative blend comprising a second isocyanate-reactive component comprising at least two amino groups, a trifunctional polyol, and at least one free radical initiator,
    wherein the composition comprises crosslinks between the hydrocarbons.

2. The golf ball of claim 1, wherein the isocyanate-containing component comprises at least two isocyanate groups.

3. The golf ball of claim 1, wherein the first isocyanate-reactive component comprises amine-terminated polybutadiene.

4. The golf ball of claim 3, wherein the amine-terminated polybutadiene comprises primary amino groups at the terminal ends of the polybutadiene.

5. The golf ball of claim 3, wherein the amine-terminated polybutadiene comprises secondary amino groups at the terminal ends of the polybutadiene.

6. The golf ball of claim 3, wherein the amine-terminated polybutadiene comprises primary amino groups, secondary amino groups, or a combination thereof at the terminal ends of the polybutadiene.

7. The golf ball of claim 1, wherein the at least one free radical initiator comprises peroxide.

8. A golf ball comprising:
a core; and
a cover formed from a composition comprising:
   a prepolymer comprising:
      a polymer backbone comprising a conjugated diene and urea linkages; and
      a plurality of terminal ends comprising isocyanate groups;
   a curative blend comprising an isocyanate-reactive component, a trifunctional polyol, and a free radical initiator, wherein the isocyanate-reactive component comprises at least two terminal amino groups capable of reacting with the isocyanate groups, and wherein the free radical initiator is capable of crosslinking the polymer backbone.

9. The golf ball of claim 8, wherein the polymer backbone comprises polybutadiene.

10. The golf ball of claim 8, wherein the free radical initiator comprises peroxide.

11. The golf ball of claim 8, wherein the isocyanate-reactive component comprises a amine-terminated component.

12. The golf ball of claim 11, wherein the composition consists essentially of urea linkages.

13. The golf ball of claim 8, wherein the prepolymer consists essentially of urea linkages.

14. A method of forming a golf ball comprising a core and a cover comprising the steps of:
providing a core;
providing a conjugated diene comprising a plurality of terminal ends comprising amino groups;
reacting the conjugated diene with an isocyanate-containing component to form a prepolymer comprising urea linkages;
forming a curative blend comprising:
   a amine-terminated curing agent;
   a trifunctional polyol; and
   an organic peroxide;
reacting the prepolymer and curative blend to form a composition comprising urea linkages and crosslinks between the hydrocarbons; and
casting a golf ball cover about the core from the composition.

15. The golf ball of claim 14, wherein the plurality of terminal ends comprise primary amino groups, secondary amino groups, or a combination thereof.

16. The golf ball of claim 14, wherein the isocyanate-containing component comprises at least two isocyanate groups.

17. The golf ball of claim 14, wherein the conjugated diene comprises amine-terminated polybutadiene.

* * * * *